(No Model.)
P. H. JACKSON.
ILLUMINATING BASEMENTS.
No. 269,292. Patented Dec. 19, 1882.
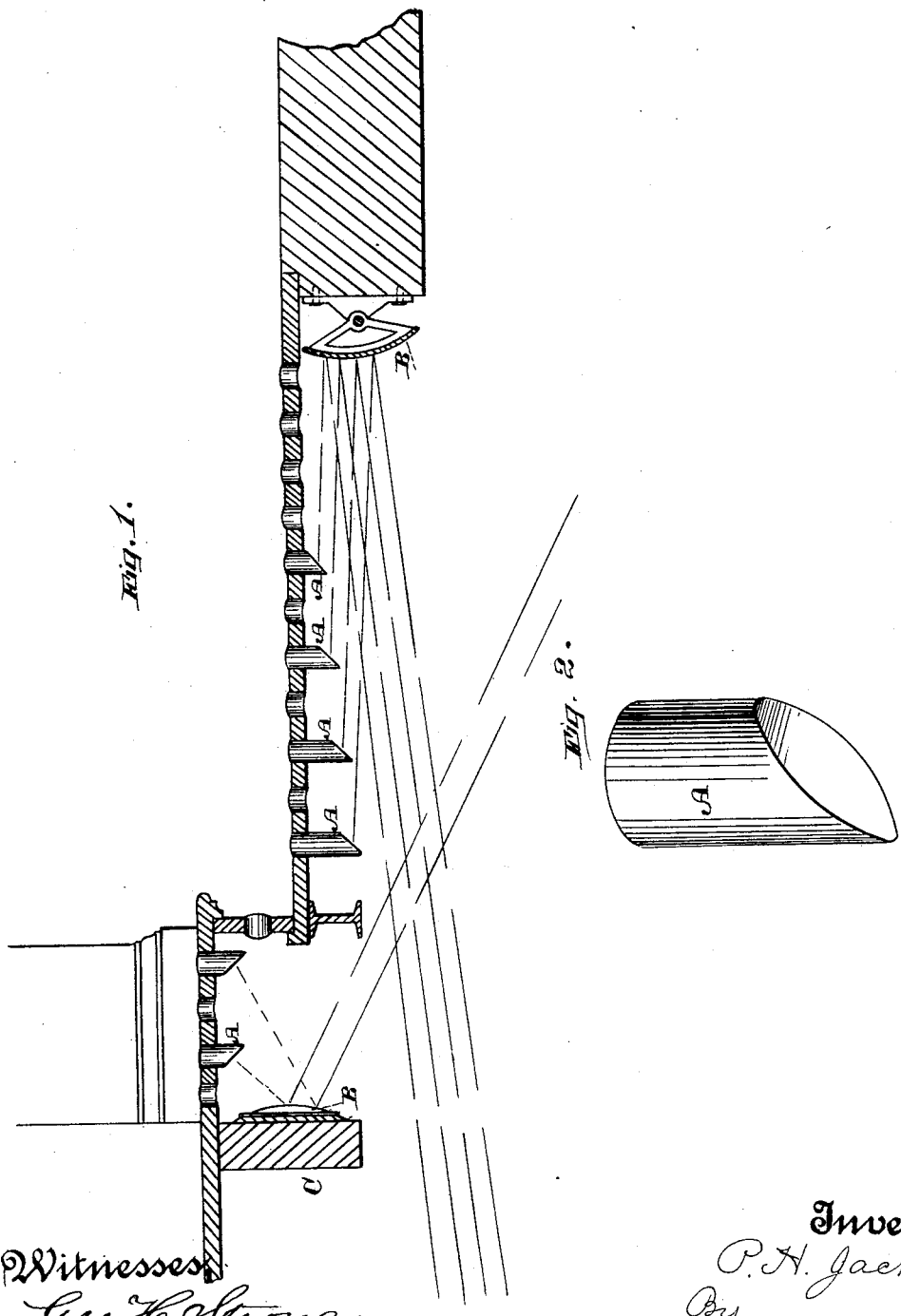
Witnesses
Geo. H. Strong
J. H. Strouse
Inventor,
P. H. Jackson
By
Dewey & Co.
Attorneys

UNITED STATES PATENT OFFICE.

PETER H. JACKSON, OF SAN FRANCISCO, CALIFORNIA.

ILLUMINATING BASEMENTS.

SPECIFICATION forming part of Letters Patent No. 269,292, dated December 19, 1882.

Application filed October 10, 1882. (No model.)

*To all whom it may concern:*

Be it known that I, PETER H. JACKSON, of the city and county of San Francisco, State of California, have invented an Improvement in Illuminating Basements; and I hereby declare the following to be a full, clear, and exact description thereof.

My invention relates to certain improvements in illuminating basements; and it consists in the combination of refracting-lenses set in the sidewalk, basement-extension, or door-step, with one or more reflecting-mirrors, which are fixed or adjusted at the front so as to receive light from the lenses and reflect it backward into the cellar or basement, as will be more fully explained by reference to the accompanying drawings, in which—

Figure 1 is a vertical section, showing my apparatus. Fig. 2 is an enlarged view of a lens.

When basements or basement-extensions are lighted by the ordinary lenses or illuminating-tiles the light is thrown directly downward, and produces but little effect behind the line of the front wall of the building, so that long cellars or basements have no light in a great portion of their extent, except that produced by artificial means. This defect in lighting has been partially overcome by the use of refracting-lenses so set in the step or sidewalk as to refract the light backward into the cellar. This device is open to the objection that it is useless and even detrimental where beams, sills, water-tables, or wide bearing-bars exist, and the inventor states that in such cases it is better to use plain lenses.

My invention consists of the lenses A, having the lower end forming a diagonal plane, as shown, and so set as to refract the light forward, and in combination with these the reflecting-mirrors B, fixed at a point where they will receive this refracted light and reflect and diffuse it through the cellar or basement at the rear. The reflectors B are fixed upon the rear portion of the riser when the refracting-lenses are in the door sill or step, and are so arranged as to throw the light received upon them beneath the beams C.

For those lenses which are fixed in the area-covering the mirrors must be placed at the back of the sidewalk-arches, and if lenses are placed in the sidewalk the mirrors should be fixed upon the bulk-head wall between the space under the sidewalk and the street. In all cases the mirrors must be placed at such a point as to receive the refracted rays of light which are thrown forward from the lenses, and reflect them backward into the rear portion of the basement. The lenses are so graduated in the depth to which they extend below the plates in which they are set that the shortest will be the nearest to the mirrors, and the length will be gradually increased as they recede from the mirrors, so that the light refracted from all may fall upon the mirrors without obstruction.

The mirrors may be made plain or convex, but I have preferred convex mirrors, as they will cause the rays of light to diverge, and will diffuse them through the basement more effectually. The mirrors may be made stationary or they may be adjustable, singly or in series. The position of the mirrors and the angle of refraction of the lenses may be also so determined that the light thrown back from the mirrors will not be obstructed by any beams or sills, and will thus illuminate the whole basement to its farthest extremity.

Having thus described my invention, what I claim as new, and desire to secure by Letters Patent, is—

1. In a basement and basement-extension, the refracting-lenses A, fitted into the step, area, or sidewalk so as to throw the light forward, in combination with the mirror or mirrors B, to receive the refracted light and reflect it backward into the basement, substantially as herein described.

2. In combination with the refracting-lenses A, fixed in an area or sidewalk above a basement-extension, so as to throw light forward, the convex adjustable mirror or mirrors B, substantially as herein described.

3. In an area basement-extension, and in combination with the mirror or mirrors B, fixed or adjustable at the front of the space, the refracting-lenses A, fixed in the surface above and diminishing in length as they approach the mirrors, so that the light from those behind shall not be obstructed by those in front, substantially as herein described.

In witness whereof I hereunto set my hand.

PETER H. JACKSON.

Witnesses:
S. H. NOURSE,
G. W. EMERSON.